United States Patent
Wang et al.

(10) Patent No.: US 10,871,952 B2
(45) Date of Patent: Dec. 22, 2020

(54) METHOD AND SYSTEM FOR PROVIDING SECURE OVER-THE-AIR VEHICLE UPDATES

(71) Applicant: NIO USA, Inc., San Jose, CA (US)

(72) Inventors: Qiyan Wang, Mountain View, CA (US); Abraham T. Chen, San Jose, CA (US); Veysel Özer, Ulm (DE)

(73) Assignee: NIO USA, Inc., San Jose, CA (US)

( * ) Notice: Subject to any disclaimer, the term of this patent is extended or adjusted under 35 U.S.C. 154(b) by 147 days.

(21) Appl. No.: 15/849,131

(22) Filed: Dec. 20, 2017

(65) Prior Publication Data
US 2019/0187971 A1    Jun. 20, 2019

(51) Int. Cl.
| | | |
|---|---|---|
| *G06F 8/65* | (2018.01) | |
| *H04W 12/04* | (2009.01) | |
| *H04W 4/50* | (2018.01) | |
| *H04W 4/40* | (2018.01) | |
| *H04L 29/08* | (2006.01) | |
| *H04L 29/06* | (2006.01) | |

(52) U.S. Cl.
CPC ............ *G06F 8/65* (2013.01); *H04L 63/0823* (2013.01); *H04L 67/34* (2013.01); *H04W 4/50* (2018.02); *H04W 12/04* (2013.01); *H04W 4/40* (2018.02)

(58) Field of Classification Search
CPC ........... G06F 8/65; H04W 4/50; H04W 12/04; H04L 67/34; H04L 63/0823; H04L 4/40
See application file for complete search history.

(56) References Cited

U.S. PATENT DOCUMENTS

| | | | | |
|---|---|---|---|---|
| 7,184,866 B2* | 2/2007 | Squires | ................. | A62C 27/00 701/29.3 |
| 7,457,945 B2* | 11/2008 | Dailey | ................. | G06F 21/572 713/2 |
| 8,276,208 B2* | 9/2012 | Morgan | ............. | G06F 11/2023 714/4.11 |
| 8,631,404 B2* | 1/2014 | Laor | ........................ | G06F 8/65 718/1 |
| 8,856,536 B2* | 10/2014 | Rabadi | ................. | G06F 21/572 713/176 |

(Continued)

FOREIGN PATENT DOCUMENTS

WO    WO 2015/109804    7/2015

OTHER PUBLICATIONS

Bonomi, "The Smart and Connected Vehicle and the Internet of Things," Cisco Systems, 2013, 53 pages.

(Continued)

*Primary Examiner* — Lynn D Feild
*Assistant Examiner* — Vladimir I Gavrilenko
(74) *Attorney, Agent, or Firm* — Sheridan Ross P.C.

(57) ABSTRACT

Embodiments of the present disclosure are directed to methods and systems for providing secure over-the-air firmware updates to one or more vehicles. More specifically, the present disclosure describes applying to firmware images distributed to one or more vehicles encryption that is unique to each update version. The encryption is also unique to each vehicle receiving the update. Embodiments of the present disclosure can also include determining and verifying the integrity of an available OTA firmware update prior to authorizing installation of the firmware update in a vehicle.

17 Claims, 8 Drawing Sheets

(56) References Cited

U.S. PATENT DOCUMENTS

| | | | |
|---|---|---|---|
| 8,887,144 B1* | 11/2014 | Marr | G06F 8/65 717/168 |
| 8,943,489 B1* | 1/2015 | Qu | G06F 8/656 717/168 |
| 9,021,459 B1* | 4/2015 | Qu | G06F 8/65 710/33 |
| 9,059,978 B2* | 6/2015 | Kotani | G06F 8/65 |
| 9,563,418 B1* | 2/2017 | Walton | G06F 8/65 |
| 9,804,901 B2* | 10/2017 | Gambardella | H04L 65/80 |
| 9,961,168 B1* | 5/2018 | Malkawi | H04L 69/08 |
| 10,209,981 B2* | 2/2019 | Hirshberg | G06F 11/1433 |
| 2003/0095648 A1* | 5/2003 | Kaib | A61B 5/0006 379/106.02 |
| 2008/0027602 A1* | 1/2008 | Yeap | B60R 25/04 701/31.4 |
| 2008/0163189 A1 | 7/2008 | Chen et al. | |
| 2008/0168244 A1* | 7/2008 | Chu Chen | G06F 11/1417 711/162 |
| 2009/0138870 A1* | 5/2009 | Shahindoust | G06F 8/65 717/172 |
| 2010/0008510 A1* | 1/2010 | Zayas | G06F 21/572 380/283 |
| 2010/0146231 A1* | 6/2010 | Gopalan | G06F 11/1458 711/162 |
| 2011/0125601 A1* | 5/2011 | Carpenter | G06Q 30/06 705/26.1 |
| 2013/0013877 A1 | 1/2013 | Tian | |
| 2013/0036311 A1* | 2/2013 | Akyol | H04L 63/08 713/189 |
| 2014/0004825 A1* | 1/2014 | Prakash | H04W 12/06 455/411 |
| 2014/0066014 A1* | 3/2014 | Nicholson | H04W 12/08 455/411 |
| 2014/0137125 A1* | 5/2014 | Hsu | G06F 9/4856 718/102 |
| 2014/0282470 A1* | 9/2014 | Buga | G06F 8/65 717/170 |
| 2015/0095898 A1 | 4/2015 | Mitchell et al. | |
| 2015/0180840 A1* | 6/2015 | Jung | G06F 8/654 713/150 |
| 2015/0278046 A1 | 10/2015 | Zellermayer et al. | |
| 2015/0301821 A1 | 10/2015 | Danne et al. | |
| 2015/0355898 A1 | 12/2015 | Zhang et al. | |
| 2016/0036814 A1* | 2/2016 | Conrad | H04W 12/0023 713/171 |
| 2016/0170733 A1* | 6/2016 | Martin | G06F 8/65 713/191 |
| 2016/0196132 A1* | 7/2016 | Searle | H04L 41/082 717/173 |
| 2016/0210141 A1 | 7/2016 | Gunti et al. | |
| 2016/0210157 A1* | 7/2016 | Kim | G06F 9/4406 |
| 2016/0291959 A1 | 10/2016 | Searle et al. | |
| 2016/0294605 A1 | 10/2016 | Searle et al. | |
| 2016/0294614 A1* | 10/2016 | Searle | G06F 8/654 |
| 2016/0335073 A1 | 11/2016 | Hong | |
| 2017/0094446 A1* | 3/2017 | Maggiore | H04W 12/06 |
| 2017/0104580 A1* | 4/2017 | Wooten | G06F 8/65 |
| 2017/0124564 A1* | 5/2017 | Pi Farias | G06Q 20/203 |
| 2017/0180391 A1 | 6/2017 | Hinchliffe et al. | |
| 2017/0249135 A1* | 8/2017 | Gandhi | G06F 8/65 |
| 2017/0279620 A1* | 9/2017 | Kravitz | H04L 9/3268 |
| 2018/0006829 A1* | 1/2018 | Kravitz | H04L 9/3255 |
| 2018/0074842 A1 | 3/2018 | Fu et al. | |
| 2018/0123804 A1* | 5/2018 | Smith | H04L 9/3263 |
| 2018/0143818 A1* | 5/2018 | Hirshberg | G06F 11/1433 |
| 2018/0144147 A1* | 5/2018 | Nix | H04L 9/0869 |
| 2018/0234496 A1* | 8/2018 | Ratias | H04L 67/22 |
| 2018/0293067 A1* | 10/2018 | Hirshberg | G06F 9/45558 |
| 2019/0102159 A1* | 4/2019 | Gur | G06F 8/65 |
| 2019/0171819 A1* | 6/2019 | Gentili | G06F 12/1408 |
| 2019/0187971 A1* | 6/2019 | Wang | G06F 8/65 |

OTHER PUBLICATIONS

Notice of Allowance for U.S. Appl. No. 15/423,186, dated Sep. 21, 2018, 8 pages.

Official Action for U.S. Appl. No. 15/484,469, dated Nov. 1, 2018, 39 pages.

International Preliminary Report on Patentability (PCT) Patent Application No. PCT/US18/66840, dated Jul. 2, 2020, 8 pages.

U.S. Appl. No. 15/423,186, filed Feb. 2, 2017, Hirshbreg et al.

U.S. Appl. No. 15/484,469, filed Apr. 11, 2017, Hirshbreg.

"Cisco IOS High Availability (HA)—Technical Overview," Cisco, 2006, retrieved from https://www.cisco.com/c/dam/en/us/products/collateral/ios-nx-os-software/high-availability/prod_presentation0900aecd80456cb8.pdf, 24 pages.

"Cisco IOS In service software upgrade," Cisco, 2007, retrieved from https://www.cisco.com/c/en/us/td/docs/ios/12_2sb/feature/guide/sb_issu.html, 57 pages.

Pott, "VMware: We're gonna patent hot-swapping your VMs' host OS," The Register, 2016, retrieved from http://www.theregister.co.uk/2016/08/02/vmware_files_patent_os_hot_swaps/, 7 pages.

Sena, "Secure Over-the-Air-Vehicle Software Updates," International Telecommunication Union, 2015, 49 pages.

International Search Report and Written Opinion for International (PCT) Patent Application No. PCT/US18/66840, dated Feb. 28, 2019, 9 pages.

Notice of Allowance for U.S. Appl. No. 15/484,469, dated Mar. 4, 2019, 12 pages.

\* cited by examiner

METHOD AND SYSTEM FOR PROVIDING SECURE OVER-THE-AIR VEHICLE UPDATES

FIELD

The present disclosure is generally directed to vehicle systems, in particular, toward providing secure over-the-air updates to firmware of the vehicle.

BACKGROUND

Over-the-air (OTA) updates have been used to deliver firmware and/or software updates to mobile devices for some time. Only recently have vehicle manufacturers begun delivering OTA updates and/or upgrades to select vehicles. For example, vehicle manufacturers may offer OTA updates to vehicles having low revision software or firmware installed. The OTA updates may fix bugs, security holes, and/or provide additional functionality. Additionally, vehicle manufacturers may offer specific OTA upgrades to vehicles that can, among other things, improve a vehicle's range, function, top speed, etc. In some cases, these "upgrades" may be locked features of a firmware package already installed in the vehicle during manufacturing. The upgrades may be "unlocked," or made available to a user's vehicle, upon payment of fees and authorization by the manufacturer.

In any event, the security surrounding the release of these OTA updates/upgrades may be subject to hacking, cracking, and/or some other unauthorized removal of restrictions. In some cases, the security of the vehicle itself may be compromised such that unauthorized updates/upgrades can be installed in the vehicle. This lack of security can compromise the integrity of the vehicle, safety, operation, and/or other aspect. Hence, there is a need in the art for improved methods and systems for securely providing OTA firmware updates to a vehicle.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
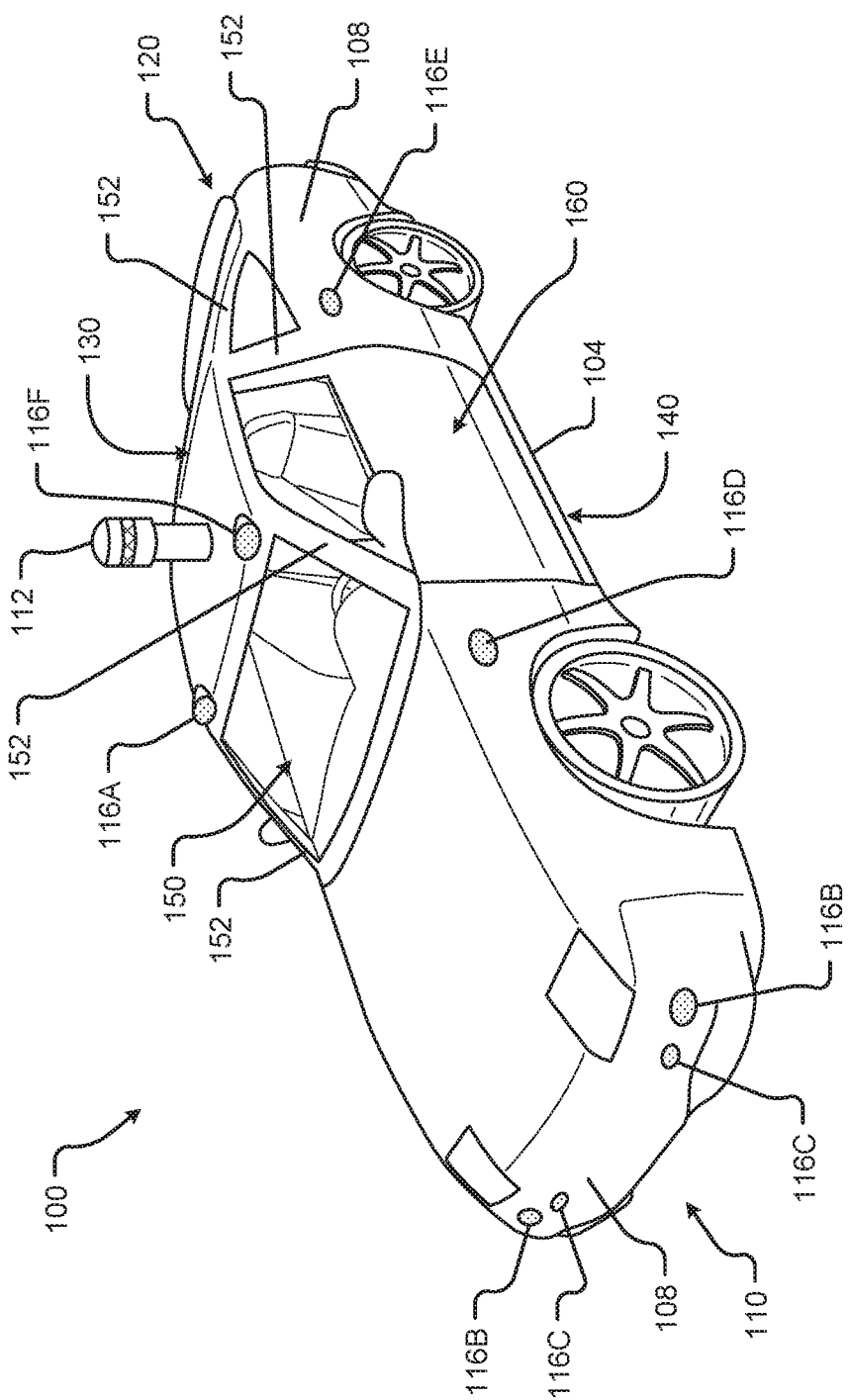
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
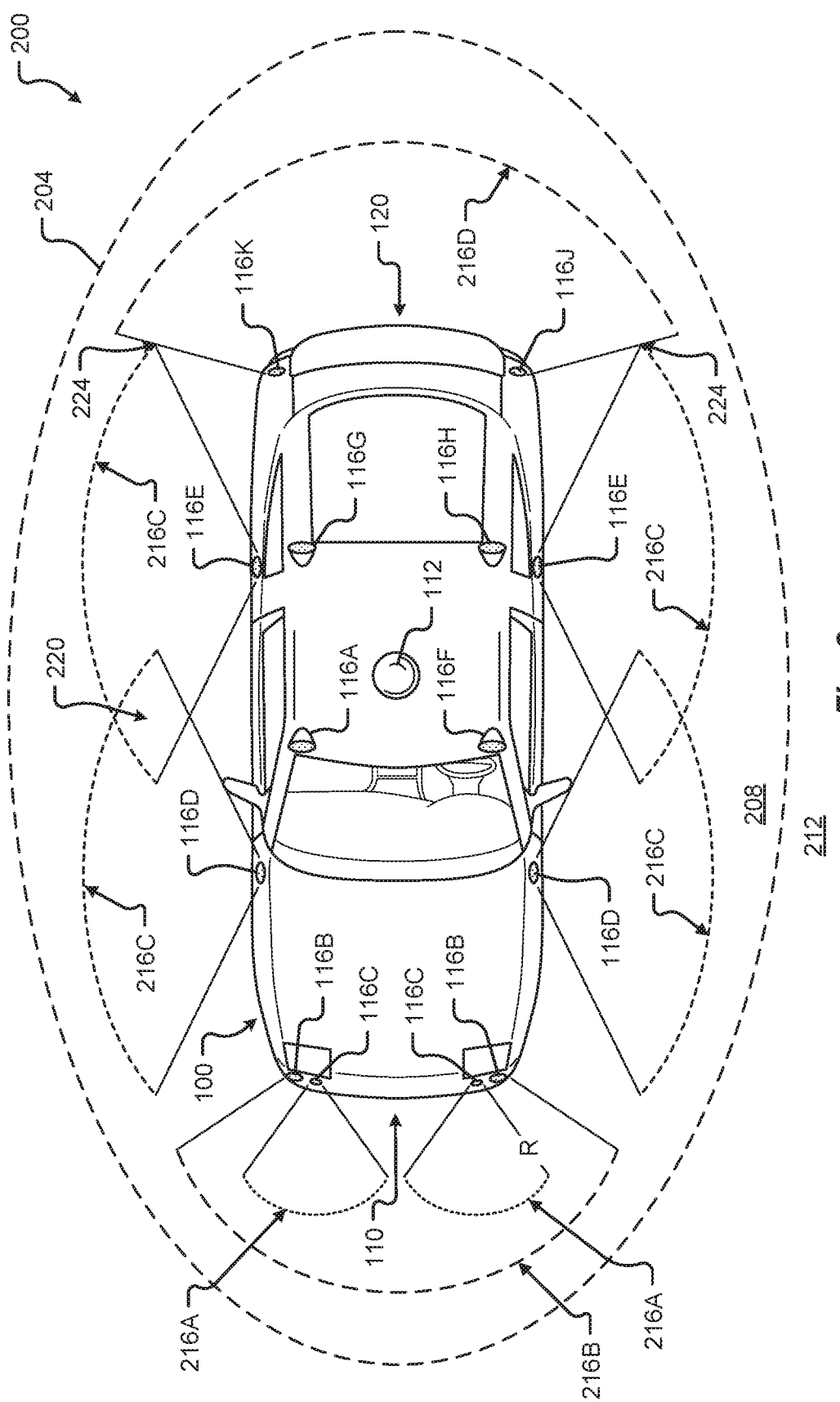
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
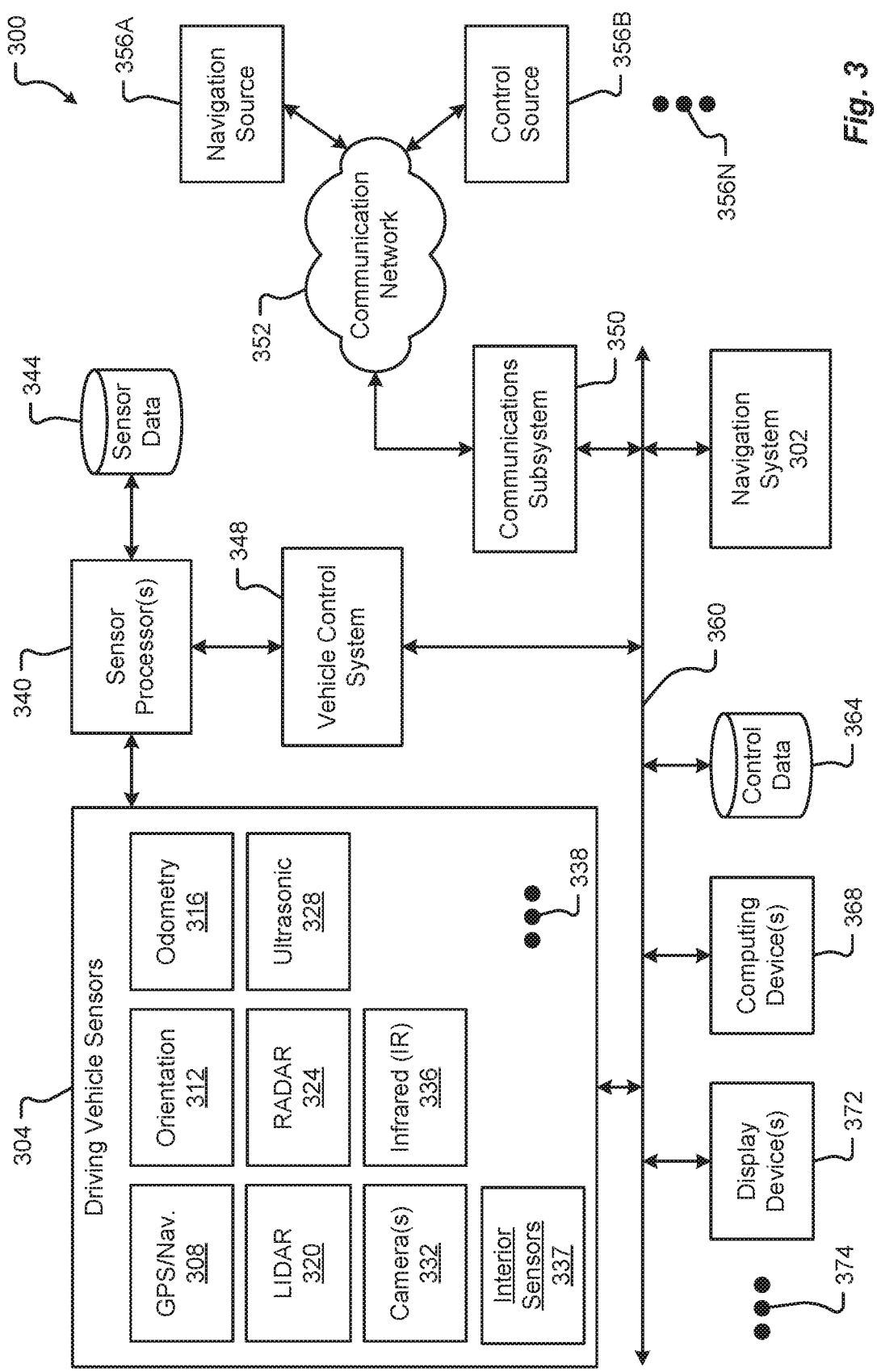
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100.

A navigation system 302 can include any hardware and/or software used to navigate the vehicle either manually or autonomously.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 4. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
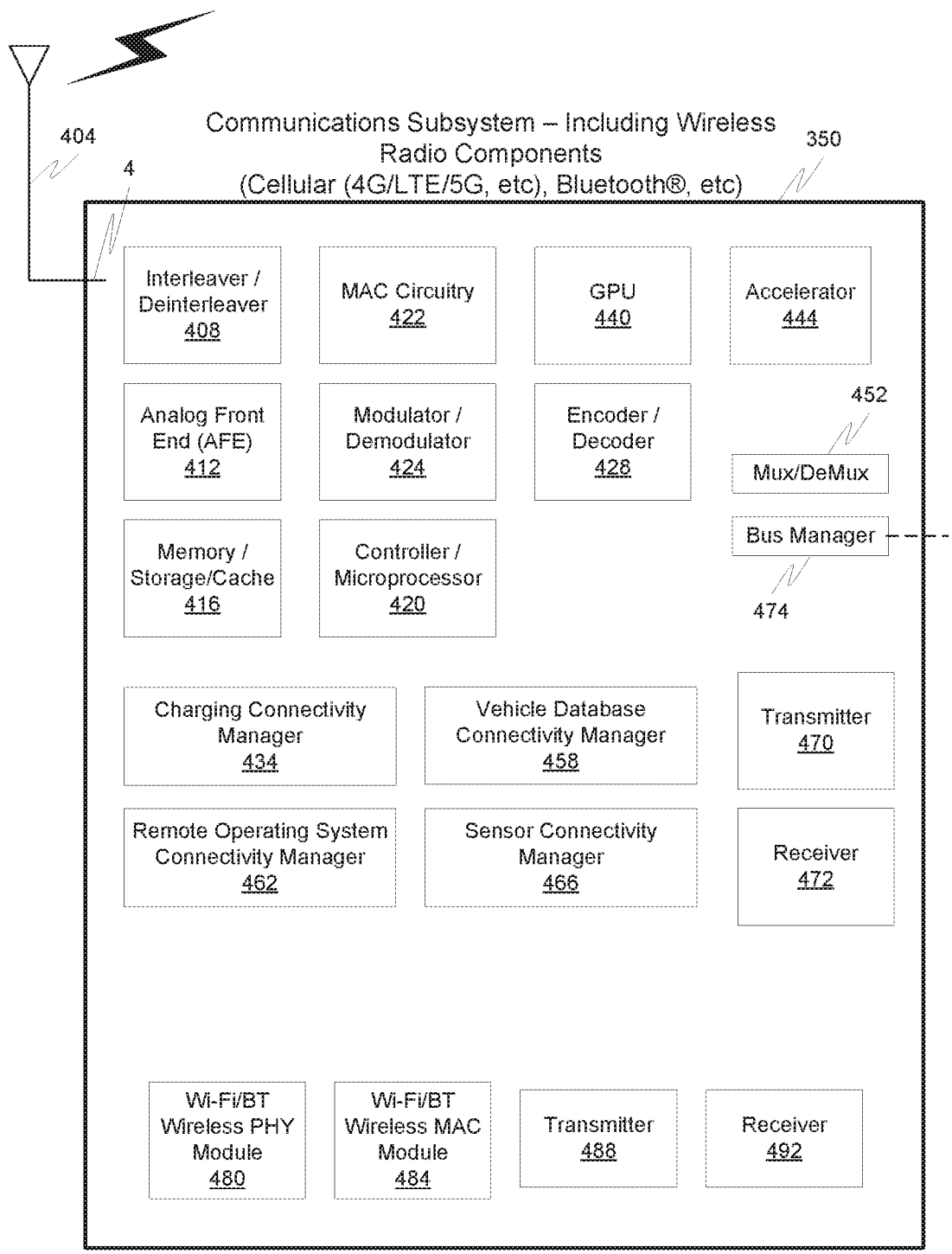
FIG. 4 is a block diagram of an embodiment of a communications subsystem of the vehicle according to one embodiment of the present disclosure.

FIG. 4 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses, including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 404, an interleaver/deinterleaver 408, an analog front end (AFE) 412, memory/storage/cache 416, controller/microprocessor 420, MAC circuitry 422, modulator/demodulator 424, encoder/decoder 428, a plurality of connectivity managers 434, 458, 462, 466, GPU 440, accelerator 444, a multiplexer/demultiplexer 452, transmitter 470, receiver 472 and additional wireless radio components such as a Wi-Fi PHY/Bluetooth® module 480, a Wi-Fi/BT MAC module 484, additional transmitter(s) 488 and additional receiver(s) 492. The various elements in the device 350 are connected by one or more links/busses 4 (not shown, again for sake of clarity).

The device 350 can have one more antennas 404, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 404 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 404 generally interact with the Analog Front End (AFE) 412, which is needed to enable the correct processing of the received modulated signal and signal conditioning for a transmitted signal. The AFE 412 can be functionally located between the antenna and a digital baseband system in order to convert the analog signal into a digital signal for processing and vice-versa.

The subsystem 350 can also include a controller/microprocessor 420 and a memory/storage/cache 416. The subsystem 350 can interact with the memory/storage/cache 416 which may store information and operations necessary for configuring and transmitting or receiving the information described herein. The memory/storage/cache 416 may also be used in connection with the execution of application programming or instructions by the controller/microprocessor 420, and for temporary or long term storage of program instructions and/or data. As examples, the memory/storage/cache 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the subsystem 350. Furthermore, the controller/microprocessor 420 can perform operations for configuring and transmitting/receiving information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 470, 488 and receiver(s) 472, 492 which can transmit and receive signals, respectively, to and from other devices, subsystems and/or other destinations using the one or more antennas 404 and/or links/busses. Included in the subsystem 350 circuitry is the medium access control or MAC Circuitry 422. MAC circuitry 422 provides for controlling access to the wireless medium. In an exemplary embodiment, the MAC circuitry 422 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 440, an accelerator 444, a Wi-Fi/BT/BLE (Bluetooth® Low-Energy) PHY module 480 and a Wi-Fi/BT/BLE MAC module 484 and optional wireless transmitter 488 and optional wireless receiver 492. In some embodiments, the GPU 440 may be a graphics processing unit, or visual processing unit, comprising at least one circuit and/or chip that manipulates and changes memory to accelerate the creation of images in a frame buffer for output to at least one display device. The GPU 440 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 434, 458, 462, 466 manage and/or coordinate communications between the subsystem 350 and one or more of the systems disclosed herein and one or more other devices/systems. The connectivity managers 434, 458, 462, 466 include a charging connectivity manager 434, a vehicle database connectivity manager 458, a remote operating system connectivity manager 462, and a sensor connectivity manager 466.

The charging connectivity manager 434 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 434 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 458 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 462 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 466 facilitates communications between any one or more of the vehicle sensors (e.g., the driving vehicle sensors and systems 304, etc.) and any one or more of the other vehicle systems. The sensor connectivity manager 466 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 5:
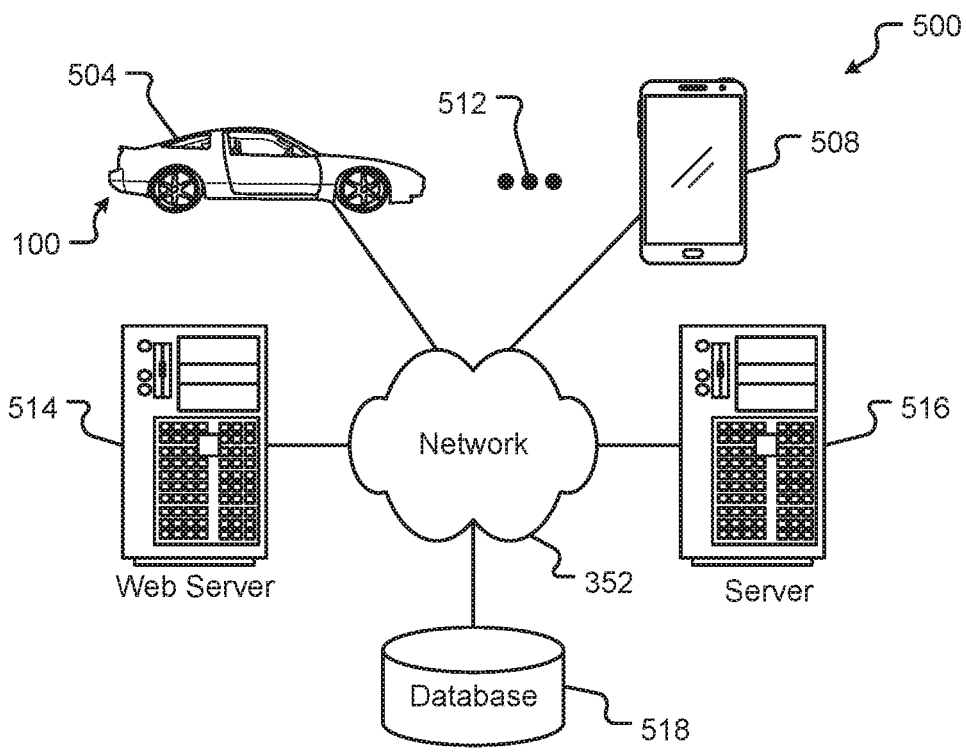
FIG. 5 is a block diagram of a computing environment associated with the embodiments presented herein.

FIG. 5 illustrates a block diagram of a computing environment 500 that may function as the servers, user computers, or other systems provided and described herein. The computing environment 500 includes one or more user computers, or computing devices, such as a vehicle computing device 504, a communication device 508, and/or more 512. The computing devices 504, 508, 512 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 504, 508, 512 may also have any of a variety of applications, including for example, database client and/or server applications, and web browser applications. Alternatively, the computing devices 504, 508, 512 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 500 is shown with two computing devices, any number of user computers or computing devices may be supported.

The computing environment 500 may also include one or more servers 514, 516. In this example, server 514 is shown as a web server and server 516 is shown as an application server. The web server 514, which may be used to process requests for web pages or other electronic documents from computing devices 504, 508, 512. The web server 514 can be running an operating system including any of those discussed above, as well as any commercially-available server operating systems. The web server 514 can also run a variety of server applications, including SIP (Session Initiation Protocol) servers, HTTP(s) servers, FTP servers, CGI servers, database servers, Java® servers, and the like. In some instances, the web server 514 may publish operations available operations as one or more web services.

The computing environment 500 may also include one or more file and or/application servers 516, which can, in addition to an operating system, include one or more applications accessible by a client running on one or more of the computing devices 504, 508, 512. The server(s) 516 and/or 514 may be one or more general purpose computers capable of executing programs or scripts in response to the computing devices 504, 508, 512. As one example, the server 516, 514 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 516 may also include database servers, including without limitation those commercially available from Oracle®, Microsoft®, Sybase®, IBM® and the like, which can process requests from database clients running on a computing device 504, 508, 512.

The web pages created by the server 514 and/or 516 may be forwarded to a computing device 504, 508, 512 via a web (file) server 514, 516. Similarly, the web server 514 may be able to receive web page requests, web services invocations, and/or input data from a computing device 504, 508, 512 (e.g., a user computer, etc.) and can forward the web page requests and/or input data to the web (application) server 516. In further embodiments, the server 516 may function as a file server. Although for ease of description, FIG. 5 illustrates a separate web server 514 and file/application server 516, those skilled in the art will recognize that the functions described with respect to servers 514, 516 may be performed by a single server and/or a plurality of specialized servers, depending on implementation-specific needs and parameters. The computer systems 504, 508, 512, web (file) server 514 and/or web (application) server 516 may function as the system, devices, or components described in FIGS. 1-5.

The computing environment 500 may also include a database 518. The database 518 may reside in a variety of locations. By way of example, database 518 may reside on a storage medium local to (and/or resident in) one or more of the computers 504, 508, 512, 514, 516. Alternatively, it may be remote from any or all of the computers 504, 508, 512, 514, 516, and in communication (e.g., via the network 352) with one or more of these. The database 518 may reside in a storage-area network ("SAN") familiar to those skilled in the art. Similarly, any necessary files for performing the functions attributed to the computers 504, 508, 512, 514, 516 may be stored locally on the respective computer and/or remotely, as appropriate. The database 518 may be a relational database, such as Oracle 20i®, that is adapted to store, update, and retrieve data in response to SQL-formatted commands.

Figure 6:
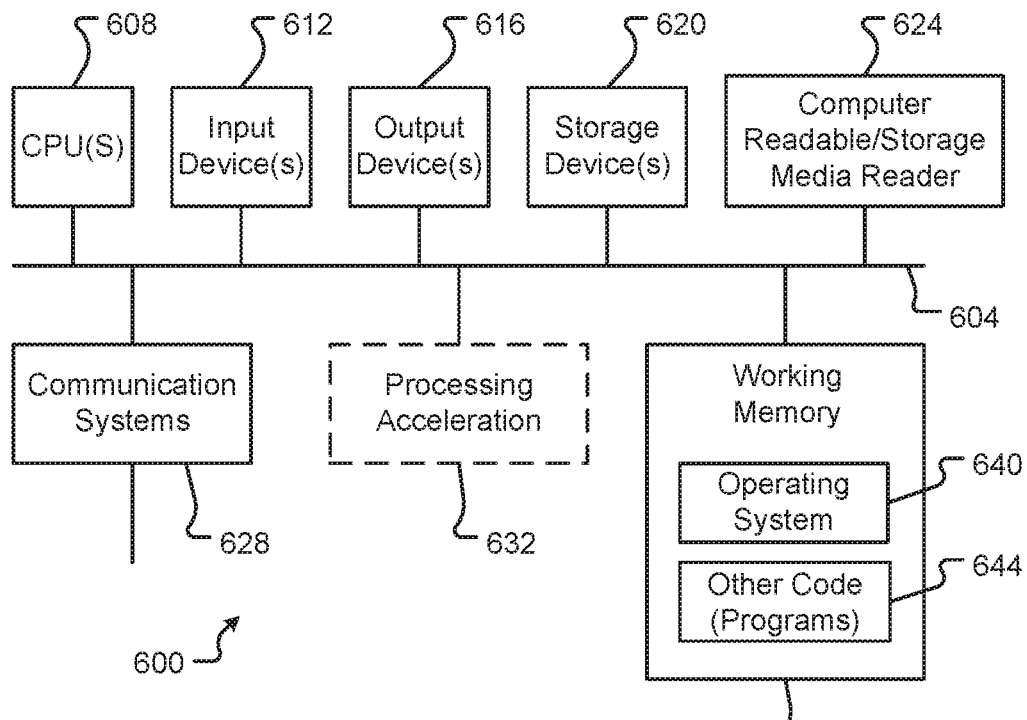
FIG. 6 is a block diagram of a computing device associated with one or more components described herein.

FIG. 6 illustrates one embodiment of a computer system 600 upon which the servers, user computers, computing devices, or other systems or components described above may be deployed or executed. The computer system 600 is shown comprising hardware elements that may be electrically coupled via a bus 604. The hardware elements may include one or more central processing units (CPUs) 608; one or more input devices 612 (e.g., a mouse, a keyboard, etc.); and one or more output devices 616 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 624; a communications system 628 (e.g., a modem, a network card (wireless or wired), an infra-red communication device, etc.); and working memory 636, which may include RAM and ROM devices as described above. The computer system 600 may also include a processing acceleration unit 632, which can include a DSP, a special-purpose processor, and/or the like.

The computer-readable storage media reader 624 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 628 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 636, including an operating system 640 and/or other code 644. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 608 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The various systems, i.e., the ECUs and controllers, of the vehicle 100 as described above may require or otherwise be subject to updates from time to time during the normal operation of the vehicle, as part of routine maintenance, to correct or prevent errors or breakdowns, to update one or more features or functions, etc. To implement these updates, the firmware of the ECUs and/or controllers can be flashed as known in the art. Also as known in the art, an image for the firmware to be flashed can be provided Over-the-Air (OTA) to the vehicle to be updated, i.e., over one or more satellite, cellular, WiFi, and/or other networks as described above. To prevent hacking or other unauthorized and potentially dangerous access to these update images and/or the systems of the vehicle, the provided firmware images should be secured.

Embodiments of the present disclosure are directed to methods and systems for providing secure over-the-air firmware updates to one or more vehicles. More specifically, the present disclosure describes applying to firmware images distributed to one or more vehicles encryption that is unique to each update version. The encryption is also unique to each vehicle receiving the update. Embodiments of the present disclosure can also include determining and verifying the integrity of an available OTA firmware update prior to authorizing installation of the firmware update in a vehicle.

Figure 7:
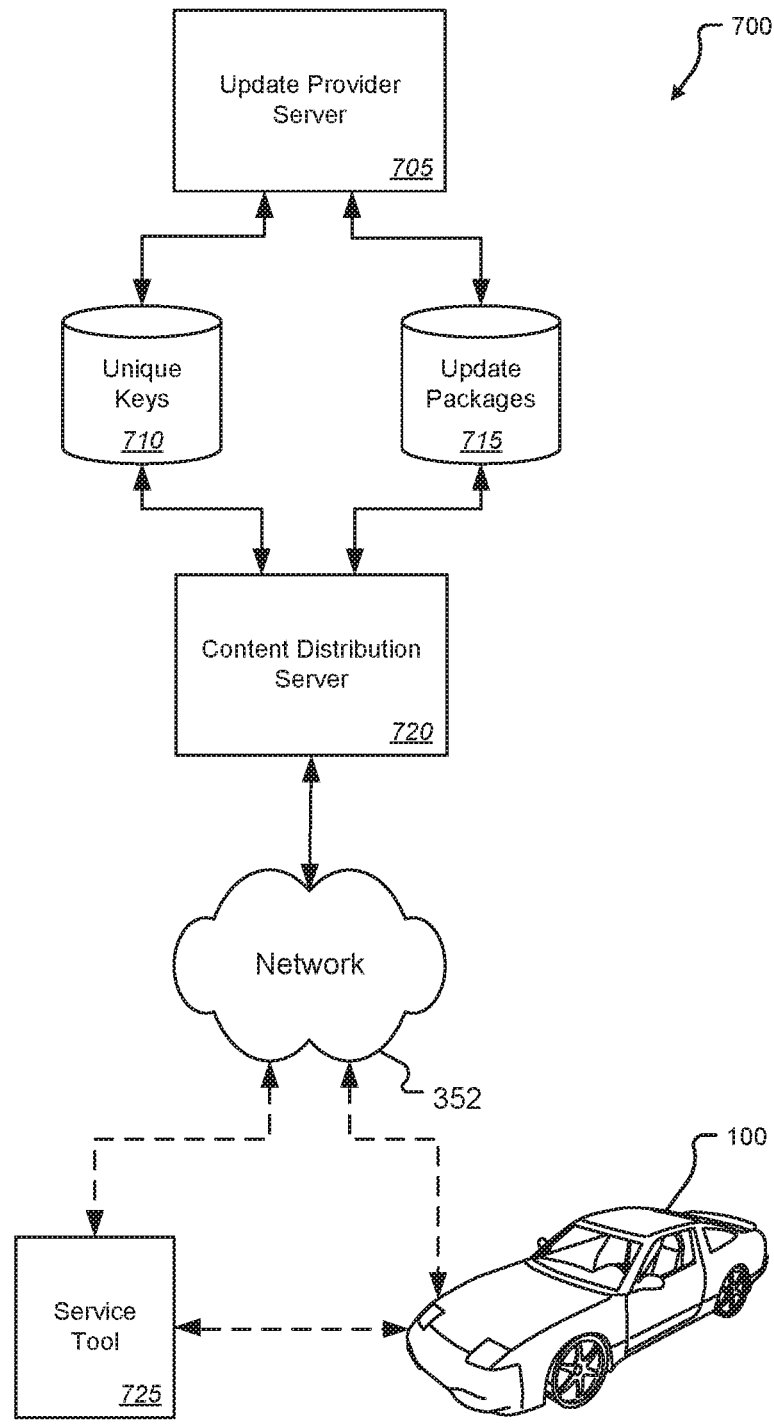
FIG. 7 is a block diagram illustrating an exemplary environment for providing secure over-the-air vehicle updates according to one embodiment of the present disclosure.

FIG. 7 is a block diagram illustrating an exemplary environment for providing secure over-the-air vehicle updates according to one embodiment of the present disclosure. As illustrated in this example, the system 700 can include one or more vehicles 100 as described above. While only one vehicle 100 is illustrated and described here for the sake of simplicity and clarity, it should be noted and understood that more than one vehicle 100, and in many cases, a very large number of vehicles will be common in typical implementation. Each vehicle 100 can be communicatively coupled with a network 352 as described above.

The system 700 can also include an update provider server 705. Generally speaking, this server 705 can provide any one or more application servers, web servers, and/or other servers as described above and may be provided and operated by a vehicle manufacturer, a third-party maintenance service provider, or other entity. The update provider server 705 can use a set of unique keys 710 to encrypt firmware update packages 715 to be distributed to the one or more vehicles 100. As will be described in greater detail below, the unique keys can comprise one or more sets of keys that are unique to each firmware update version distributed as well as one or more sets of keys unique to each vehicle 100 to which the update packages 715 will be distributed. In this way, a highly unique and therefore highly secure distribution can be provided. Also, as will be described in greater detail below, the update provider system 705 may utilize a set of certificates 730 to sign each update packages. The vehicles 100 can use these signatures to authenticate the distributed update packages 715 prior to installation.

The system can also include, in some cases, a content distribution server 720 or Content Distribution Network (CDN) as known in the art. Generally speaking, the content distribution server 705 or CDN can be used to distribute the update packages 715 and/or certificates 730 over the network 352 to the vehicles 100 according to a schedule or on demand. The content distribution server 705 or CDN can be used to distribute update packages 715 generated, encrypted, and signed by the update provider server 705 or may participate in generated and encrypting the update packages 715. For example, the update provider server may generate the update packages, encrypt them with a version-specific key 710, and make them available for distribution. The content distribution server 720 or CDN can then handle distribution to the individual vehicles including using a vehicle-specific key 710 to apply further encryption, on-the-fly or in real time, to each package as or just before it is being distributed to each individual vehicle. It should be noted and understood that, while the update provider server 705 and content distribution server 720 or CDN are illustrated and described here as separate elements, they may be physically or virtually separate or combined depending upon the exact implementation without departing from the scope of the present disclosure.

More specifically, the firmware update process can begin when the update provider server 705 generates a firmware update package 715 to be provided to one or more vehicles. This firmware update package can comprise an image of all firmware to be updated or flashed on the recipient vehicle. The image may comprise an image of all firmware for every system of the recipient vehicle or some subset of all firmware and/or systems. Since many systems of the vehicle 100 are interrelated and/or dependent upon each other, the firmware reflects many dependencies. Therefore, each update package 715 can also include a manifest defining and describing the contents of the image and dependencies of the components therein. This manifest can therefore comprise a guide for the eventual proper installation of the firmware update in the recipient vehicle.

Once the update package 715 has been generated, it can be pre-processed and encrypted with a version-specific key for that particular update version or distribution. Such encryption can comprise any of a variety of processes known in the art. For example, this version-specific encryption can comprise using a public-private key pair generated for each update version or distribution. In such cases, the update provider server 705 can use a private key of a public-private key pair to encrypt the generated update package 715 before it is made available for distribution. The public key of the pair can also be made available to the vehicles for decrypted the update packages 715 once distributed and as will be described.

According to one embodiment, the firmware update package distribution process can begin by receiving a trigger that initiates the OTA firmware update for a vehicle. The trigger may be any one or more of a number of different possible triggers that can operate independently and/or in conjunction with one another. For example, the triggers may include, but are not limited to, a periodic check by the vehicle such as an automated check or during routine maintenance, a request for pushed updates such as when a bug fix or security patch is provided by the manufacturer, and a user initiated request such as when a user performs an update check for a vehicle through the vehicle or using the user's mobile device (e.g., phone, iPad, etc.).

Once this trigger is received or detected, further encryption can be applied by the update provider server 705 or content distribution server 720 in real-time or on-the-fly just before or as the update package previously encrypted with the version-specific key is distributed to the vehicle. For example, the public key of the key pair used to encrypt the firmware update package may be encrypted using a vehicle-specific key for each target vehicle to receive the update package. This encryption can comprise symmetric-key encryption or asymmetric key encryption. In any event, a unique key associated with the vehicle may be used in conjunction with a key associated with the manufacturer to encrypt the firmware and/or the package.

According to one embodiment, each vehicle can include a set of factory-installed keys maintained in the vehicle in a secure store. These keys can be developed during manufacture of the vehicle and can be unique to each vehicle made. In other words, no two vehicles made have the same keys. Further, the keys installed in the vehicle can be secret and unknown, or hidden, to the user of the vehicle and any others. In some embodiments, this key may be associated with a vehicle ID (e.g., VIN, H/W ID, secret IMEI, etc.). The half of the vehicle-specific key maintained by the vehicle manufacturer can then be used by the update provider server 705 or content distribution server 720 to encrypt the public version of the version-specific key used to encrypt the update package 715 being provided to the vehicle 100. This encrypted version-specific key can then also be provided to the vehicle 100.

When the firmware is received by the vehicle 100, the vehicle 100 may use its unique, vehicle-specific key stored therein to decrypt the received version-specific key and then used the decrypted version-specific key to decrypt the firmware package into the firmware image and the manifest. The vehicle 100 can also verify the integrity of the firmware using the certificate used to sign the update package and proceed to install the firmware if authenticated. Because the vehicle-specific key used to encrypt the distributed version-specific key used to encrypt the firmware update package of each OTA update is unique, only the vehicle having the unique key, i.e., the vehicle-specific factory-installed secret unique key, used by the manufacturer to encrypt the distributed key can be used to decrypt the key for decrypting the OTA update.

In addition to the per-vehicle unique encryption used for confidentiality, the present disclosure allows for the integration and source authentication of the update packages. For example, each firmware image or update package may be signed by the vehicle manufacturer. The signer's public key can be pre-installed in each vehicle at the factory. The signature may be sent together with the OTA update package and each vehicle can verify the signature of the received package using the pre-installed key. This can prevent attackers from modifying update packages or injecting bogus, unauthorized firmware images during the OTA process.

In some embodiments, the secure OTA update may be facilitated by a service device or service tool 725 communicating with the content distribution server 720 and/or update provider server 705. According to one embodiment, the service tool 725 can comprise a cellphone, tablet, laptop computer, or other portable computing device having cellular, WiFi, Bluetooth, and/or other wireless communications abilities and can be used in any one or more environments to transport certificates used to support secure connectivity for vehicle systems in a state where the vehicle may or may not have immediate internet access. This tool 725 can also provide various service functions in these different environments. These functions can include performing diagnostics, updating firmware images, collecting log and other data from the vehicle, etc.

When used in conjunction with the other systems and processes described herein to install a firmware update package, the tool 725 may communicate with a vehicle 100 and receive a vehicle identification. This vehicle identification may be public or private information that can be used to uniquely identify the vehicle to the vehicle manufacturer. The tool 725 may communicate with the content distribution server 720 and provide the vehicle identification. Additionally or alternatively, the tool 725 may provide an authorized installation ID to verify the ability to act as an intermediary in performing the update.

In response, the content distribution server 720 may use the vehicle identification to retrieve the corresponding vehicle-specific factory-installed secret unique key for the uniquely identified vehicle. The process may continue by the content distribution server 720 using the retrieved key to retrieve firmware and encrypt corresponding decryption keys for the uniquely identified vehicle 100. This encrypted firmware update package and keys may be sent to the tool 725 for installation in the vehicle 725. If the tool 725 is lost or compromised at this point, the update is useless to any other vehicle, other than the uniquely identified vehicle, because the firmware update package cannot be decrypted without using the distributed keys which in turn can only be decrypted using the specific factory-installed secret unique key maintained in the uniquely identified vehicle. The tool 725 may then communicate with the vehicle 100 to install the firmware update package. At this point, the vehicle 100 may perform authentication of the signed firmware update package as described above.

Figure 8:
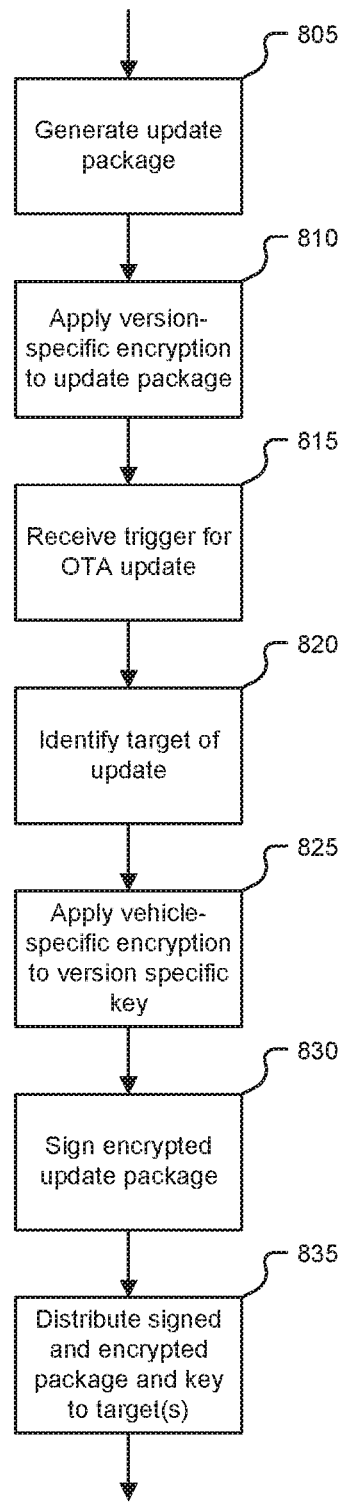
FIG. 8 is a flowchart illustrating an exemplary process for providing secure over-the-air vehicle updates according to one embodiment of the present disclosure.

FIG. 8 is a flowchart illustrating an exemplary process for providing secure over-the-air vehicle updates according to one embodiment of the present disclosure. As illustrated in this example, providing a secure Over-The-Air (OTA) firmware update can comprise generating 805, by one or more servers 705 and/or 720 such as described above, a firmware update package 715 for a plurality of vehicles 100. As noted, the generated firmware update package 715 can comprise an image for firmware to update in the plurality of vehicles 100. In some cases, the image for the firmware to update in the generated firmware update package 715 can comprise an image of all firmware for each of the plurality of vehicles 100. A manifest for the image can also be included with the generated firmware update package 715. The manifest for the image can identify contents of the image and define dependencies for modules within the identified contents of the image.

Once the firmware update package 715 has been generated 805, a version-specific encryption can be applied 810, to the generated firmware update package 715. As noted above, this encryption can comprise a pre-processing of the generated firmware update package using a key 710 specific to a version for the firmware update to generate an encrypted update package. This encrypted update package can be saved, provided to a content distribution network, or otherwise be made available for distribution to vehicles 100 to which the update should be applied.

After the firmware update package 715 has been encrypted 810 and made available for distribution, an additional layer of encryption can be applied before the update package is distributed to a vehicle. More specifically, a vehicle-specific encryption can be applied to the key specific to the version for the firmware update and used to encrypt the firmware update package 715 using a key 710 specific to each of one or more target vehicles 100. This encryption can be applied on-the-fly or in real time just before or as the encrypted update package is provided to the target vehicle(s) 100. Applying the vehicle-specific encryption to the key specific to the version for the firmware update can comprise receiving 815 a trigger for the OTA firmware update. Receiving 815 the trigger for the OTA firmware update can comprise receiving an indication of a period update check for the one or more target vehicles, receiving a request to push updates to the one or more target vehicles, or receiving a request from each of the one or more target vehicles to pull updates for the vehicle. Each target vehicle 100 of the one or more target vehicles can then be identified 820 based on the received trigger and a vehicle-specific key 710, i.e., a private key stored by the system and matching a private key stored on the vehicle 100, can be retrieved for each target vehicle 100. The key 710 specific to the version for the firmware update and used to encrypt the firmware update package 715 can then be encrypted 825 using a private key for each of the identified one or more target vehicles.

In some cases, the generated firmware update package 715 can be signed 830 with a certificate 730 authenticating a source of the generated firmware update package 715. In this way, the vehicle 100 can, upon receipt of the update package 715 and certificate 730, authenticate the received update. This signature can also be used control or restrict versions of updates. For example, upon expiration of the generated firmware update package, the certificate 730 used to sign the generated update package 715 can be added to a Certificate Revocation List (CRL) to prevent vehicles from installing an expired and no longer valid update package. It should be noted that while illustrated and described here as being performed after or while the vehicle-specific encryption is being applied 825, signing 830 of the update package, if used, can be performed at various other times without departing from the scope of the present disclosure. For example, this signing can be performed when or after the update package 715 is generated 805, when or after the version-specific encryption is applied 810, or at another time.

After the vehicle-specific encryption has been applied 825 to the version-specific key used to encrypt 810 the update package 715, the encrypted update package 715 and the encrypted key specific to the version for the firmware update can be distributed 835 to the one or more target vehicles 100. Distributing 835 the encrypted update package and the encrypted version-specific key to the one or more target vehicles comprises sending the encrypted update package and the encrypted version-specific key specific to the one or more target vehicles over one or more communications networks 352, e.g., cellular, WiFi, satellite, and/or other wireless network(s). Additionally or alternatively, distributing 835 the encrypted update package 715 and the encrypted version-specific key for the firmware update 715 to the one or more target vehicles 100 can comprise sending the encrypted update package 715 and the encrypted version-specific key over one or more communications networks 352 to a service tool 725 for installation in the one or more target vehicles 100, e.g., by transfer from the service tool to the vehicle via an OBD or other port of the vehicle.

Figure 9:
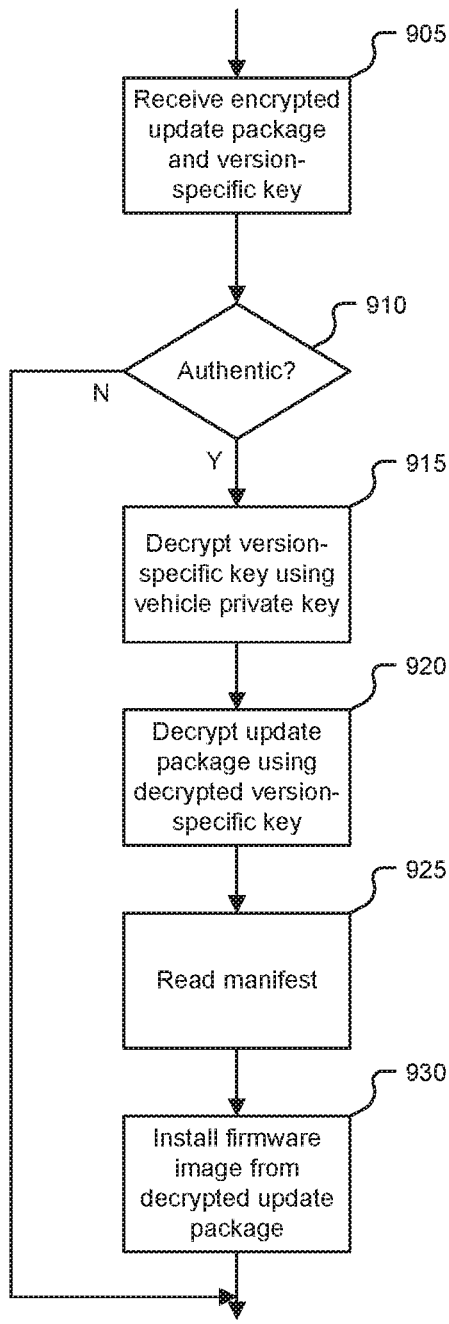
FIG. 9 is a flowchart illustrating the installation of a secure update package in a vehicle according to one embodiment of the present disclosure.

FIG. 9 is a flowchart illustrating the installation of a secure update package in a vehicle according to one embodiment of the present disclosure. As illustrated in this example, installation can begin with the vehicle 100 receiving 905, from one or more servers 705 and/or 720 as described above, an encrypted update package 715 and an encrypted key. In some cases, the encrypted update package 715 may be signed with a certificate 730 for the source of the update package 715. Therefore, a determination 910 can be made by the vehicle 100 based on this certificate 730 as to whether the received update package 715 is authentic, i.e., valid and from the true source as represented. In response to determining 910 the received package is not authentic or valid, processing can end without installing the update. In response to determining 910 the received package is authentic and valid, processing can continue with decrypting and installing the package as follows.

As described above, the update package 715 can be encrypted with a version-specific key. This version-specific key can in turn be encrypted with a vehicle-specific private key. Thus, the vehicle 100 can use the private key stored therein to decrypt 915 the received version-specific key that was used to encrypt the update package 715. Once obtained, the version-specific key can then be used to decrypt 920 the update package 715.

Also, as described above, the update package 715 can include a firmware image and a manifest. The firmware image may be for one or more systems of the vehicle 100. In some cases, the firmware image may be for all firmware of the entire vehicle, i.e., all ECUs. In any case, the manifest can identify all components or modules within the firmware image, dependencies between them, etc. and therefor provide a guide for installation. Thus, the vehicle 100 can read 925 the manifest and install 930 the firmware image based on the manifest.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for providing a secure Over-The-Air (OTA) firmware update, the method comprising: generating, by one or more servers, a firmware update package for a plurality of vehicles; applying, by the one or more servers, a version-specific encryption to the generated firmware update package using a key specific to a version for the firmware update; applying, by the one or more servers, a vehicle-specific encryption to the key specific to the version for the firmware update and used to encrypt the firmware update package using a key specific to each of one or more target vehicles of the plurality of vehicles; and distributing, by the one or more servers, the encrypted update package and the encrypted key specific to the version for the firmware update to the one or more target vehicles.

Aspects of the above method include wherein the generated firmware update package comprises an image for firmware to update in the plurality of vehicles and a manifest for the image, the manifest for the image identifying contents of the image and defining dependencies for modules within the identified contents of the image.

Aspects of the above method include wherein the image for the firmware to update in the generated firmware update package comprises an image of all firmware for each of the plurality of vehicles.

Aspects of the above method include wherein applying the vehicle-specific encryption to the key specific to the version for the firmware update further comprises: receiving, by the one or more servers, a trigger for the OTA firmware update; identifying, by the one or more servers, each target vehicle of the one or more target vehicles based on the received trigger; and encrypting, by the one or more servers, the key specific to the version for the firmware update and used to encrypt the firmware update package using a private key for each of the identified one or more target vehicles.

Aspects of the above method include wherein receiving the trigger for the OTA firmware update comprises receiving an indication of a period update check for the one or more target vehicles, receiving a request to push updates to the one or more target vehicles, or receiving a request from each of the one or more target vehicles to pull updates for the vehicle.

Aspects of the above method further include signing, by the one or more servers, the generated firmware update package with a certificate authenticating a source of the generated firmware update package.

Aspects of the above method further include, upon expiration of the generated firmware update package, adding, by the one or more servers, the certificate used to sign the generated update package to a Certificate Revocation List (CRL).

Aspects of the above method include wherein distributing the encrypted update package and the encrypted key specific to the version for the firmware update to the one or more target vehicles comprises sending the encrypted update package and the encrypted key specific to the version for the firmware update to the one or more target vehicles over one or more communications networks.

Aspects of the above method include wherein distributing the encrypted update package and the encrypted key specific to the version for the firmware update to the one or more target vehicles comprises sending the encrypted update package and the encrypted key specific to the version for the firmware update over one or more communications networks to a service tool for installation in the one or more target vehicles.

Embodiments include a system comprising: one or more communications networks; a plurality of vehicles; and one or more servers coupled with the one or more communications networks, each server comprising at least a processor and a memory coupled with and readable by the processor and storing therein a set of instructions which, when executed by the processor, causes the processor to provide a secure Over-The-Air (OTA) firmware update to one or more vehicles of the plurality of vehicles by: generating a firmware update package for the plurality of vehicles, applying a version-specific encryption to the generated firmware update package using a key specific to a version for the firmware update, applying a vehicle-specific encryption to the key specific to the version for the firmware update and used to encrypt the firmware update package using a key specific to each of one or more target vehicles of the plurality of vehicles, and distributing the encrypted update package and the encrypted key specific to the version for the firmware update to the one or more target vehicles over the one or more communications networks.

Aspects of the above system include wherein the generated firmware update package comprises an image for firmware to update in the plurality of vehicles and a manifest for the image, wherein the image for the firmware to update in the generated firmware update package comprises an image of all firmware for each of the plurality of vehicles, and wherein the manifest for the image identifies contents of the image and defines dependencies for modules within the identified contents of the image.

Aspects of the above system include wherein applying the vehicle-specific encryption to the first encrypted update package further comprises: receiving a trigger for the OTA firmware update, wherein receiving the trigger for the OTA firmware update comprises receiving an indication of a period update check for the one or more target vehicles, receiving a request to push updates to the one or more target vehicles, or receiving a request from each of the one or more target vehicles to pull updates for the vehicle; identifying each target vehicle of the one or more target vehicles based on the received trigger; and encrypting the key specific to the version for the firmware update and used to encrypt the firmware update package using a private key for each of the identified one or more target vehicles.

Aspects of the above system include wherein the instructions further cause the one or more servers to sign the generated firmware update package with a certificate authenticating a source of the generated firmware update package and, upon expiration of the generated firmware update package, add the certificate used to sign the generated update package to a Certificate Revocation List (CRL).

Aspects of the above system include wherein distributing the encrypted update package and the encrypted key specific to the version for the firmware update to the one or more target vehicles comprises sending the encrypted update package and the encrypted key specific to the version for the firmware update to the one or more target vehicles over the one or more communication networks.

Aspects of the above system further include a service tool coupled with the one or more communications networks and wherein distributing the encrypted update package and the encrypted key specific to the version for the firmware update to the one or more target vehicles comprises sending the encrypted update package and the encrypted key specific to the version for the firmware update over the one or more communication networks to the service tool and transferring the encrypted update package from the service tool to the one or more target vehicles for installation.

Embodiments include a non-transitory computer-readable medium comprising a set of instructions stored therein which, when executed by a processor, causes the processor to provide a secure Over-The-Air (OTA) firmware update to one or more vehicles of a plurality of vehicles by: generating a firmware update package for the plurality of vehicles; applying a version-specific encryption to the generated firmware update package using a key specific to a version for the firmware update; applying a vehicle-specific encryption to the key specific to the version for the firmware update and used to encrypt the firmware update package using a key specific to each of one or more target vehicles of the plurality of vehicles; and distributing the encrypted update package and the encrypted key specific to the version for the firmware update to the one or more target vehicles over the one or more communications networks.

Aspects of the above non-transitory computer-readable medium include wherein the generated firmware update package comprises an image for firmware to update in the plurality of vehicles and a manifest for the image, wherein the image for the firmware to update in the generated firmware update package comprises an image of all firmware for each of the plurality of vehicles, and wherein the manifest for the image identifies contents of the image and defines dependencies for modules within the identified contents of the image.

Aspects of the above non-transitory computer-readable medium include wherein applying the vehicle-specific encryption to the key specific to the version for the firmware update and used to encrypt the firmware update package further comprises: receiving a trigger for the OTA firmware update, wherein receiving the trigger for the OTA firmware update comprises receiving an indication of a period update check for the one or more target vehicles, receiving a request to push updates to the one or more target vehicles, or receiving a request from each of the one or more target vehicles to pull updates for the vehicle; identifying each target vehicle of the one or more target vehicles based on the received trigger; and encrypting the key specific to the version for the firmware update and used to encrypt the firmware update package using a private key for each of the identified one or more target vehicles.

Aspects of the above non-transitory computer-readable medium include wherein the instructions further cause the one or more servers to sign the generated firmware update package with a certificate authenticating a source of the generated firmware update package and, upon expiration of the generated firmware update package, add the certificate used to sign the generated update package to a Certificate Revocation List (CRL).

Aspects of the above non-transitory computer-readable medium include wherein distributing the encrypted update package and the encrypted key specific to the version for the firmware update to the one or more target vehicles comprises sending the encrypted update package and the encrypted key specific to the version for the firmware update to the one or more target vehicles over one or more communication networks or sending the encrypted update package and the encrypted key specific to the version for the firmware update over one or more communication networks to a service tool and transferring the encrypted update package and the encrypted key specific to the version for the firmware update from the service tool to the one or more target vehicles for installation.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for providing a secure Over-The-Air (OTA) firmware update, the method comprising:
    generating, by one or more servers, a firmware update package for a plurality of vehicles;
    applying, by the one or more servers, a version-specific encryption to the generated firmware update package using a version key, the version key comprising a key specific to a version for the firmware update;
    applying, by the one or more servers, a vehicle-specific encryption to the version key using a plurality of vehicle keys, each vehicle key comprising a private key maintained by the one or more servers and specific to each of the plurality of vehicles, wherein applying the vehicle-specific encryption to the version key using the plurality of vehicle keys generates a plurality of encrypted version keys; and
    distributing, by the one or more servers, the encrypted generated firmware update package and the plurality of encrypted version keys to the plurality of vehicles, wherein distributing the encrypted generated firmware update package and the plurality of encrypted version keys to the plurality of vehicles comprises sending the encrypted generated firmware update package and the plurality of encrypted version keys over one or more communication networks to a service tool and transferring the encrypted generated firmware update package and one of the plurality of encrypted version keys from the service tool to each of the plurality of vehicles for installation through an On-Board Diagnostics (OBD) port of each of the plurality of vehicles, wherein the one of the plurality of encrypted version keys transferred to each of the plurality of vehicles is selected by the service tool based on a vehicle identification of the corresponding vehicle, and wherein each vehicle decrypts the one of the plurality of encrypted version keys transferred from the service tool using a private key maintained by the corresponding vehicle, decrypts the encrypted generated firmware update package using the decrypted one of the plurality of encrypted version keys, and applies the decrypted generated firmware update package.

2. The method of claim 1, wherein the generated firmware update package comprises an image for firmware to update in the plurality of vehicles and a manifest for the image, the manifest for the image identifying contents of the image and defining dependencies for modules within the identified contents of the image.

3. The method of claim 2, wherein the image for the firmware to update in the generated firmware update package comprises an image of all firmware for each of the plurality of vehicles.

4. The method of claim 1, wherein applying the vehicle-specific encryption to the key specific to the version for the firmware update further comprises:
    receiving, by the one or more servers, a trigger for the OTA firmware update;
    identifying, by the one or more servers, each vehicle of the plurality of vehicles based on the received trigger; and
    encrypting, by the one or more servers, the version key using the private key maintained by the one or more servers for each identified vehicle of the plurality of vehicles.

5. The method of claim 4, wherein receiving the trigger for the OTA firmware update comprises receiving an indication of a period update check for the plurality of vehicles, receiving a request to push updates to the plurality of vehicles, or receiving a request from each of the plurality of vehicles to pull updates for the corresponding vehicle.

6. The method of claim 1, further comprising signing, by the one or more servers, the generated firmware update package with a certificate authenticating a source of the generated firmware update package.

7. The method of claim 6, further comprising, upon expiration of the generated firmware update package, adding, by the one or more servers, the certificate used to sign the generated firmware update package to a Certificate Revocation List (CRL).

8. The method of claim 1, wherein distributing the encrypted generated firmware update package and the encrypted version keys to the plurality of vehicles comprises sending the encrypted generated firmware update package and the encrypted version keys to the plurality of vehicles over one or more communications networks.

9. A system comprising:
    one or more communications networks;

a plurality of vehicles; and one or more servers coupled with the one or more communications networks, each server comprising at least a processor and a memory coupled with and readable by the processor and storing therein a set of instructions which, when executed by the processor, causes the processor to provide a secure Over-The-Air (OTA) firmware update to one or more vehicles of the plurality of vehicles by:

generating a firmware update package for the plurality of vehicles, applying a version-specific encryption to the generated firmware update package using a version key, the version key comprising a key specific to a version for the firmware update, applying a vehicle-specific encryption to the version key using a plurality of vehicle keys, each vehicle key comprising a private key maintained by the one or more servers and specific to each of the plurality of vehicles, wherein applying the vehicle-specific encryption to the version key using the plurality of vehicle keys generates a plurality of encrypted version keys, and distributing the encrypted generated firmware update package and the plurality of encrypted version keys to the plurality of vehicles over the one or more communications networks, wherein distributing the encrypted generated firmware update package and the plurality of encrypted version keys to the plurality of vehicles comprises sending the encrypted generated firmware update package and the plurality of encrypted version keys over the one or more communication networks to a service tool and transferring the encrypted generated firmware update package and one of the plurality of encrypted version keys from the service tool to each of the plurality of vehicles for installation through an On-Board Diagnostics (OBD) port of each of the plurality of vehicles, wherein the one of the plurality of encrypted version keys transferred to each of the plurality of vehicles is selected by the service tool based on a vehicle identification of the corresponding vehicle, and wherein each vehicle decrypts the one of the plurality of encrypted version keys transferred from the service tool using a private key maintained by the corresponding vehicle, decrypts the encrypted generated firmware update package using the decrypted one of the plurality of encrypted version keys, and applies the decrypted generated firmware update package.

10. The system of claim 9, wherein the generated firmware update package comprises an image for firmware to update in the plurality of vehicles and a manifest for the image, wherein the image for the firmware to update in the generated firmware update package comprises an image of all firmware for each of the plurality of vehicles, and wherein the manifest for the image identifies contents of the image and defines dependencies for modules within the identified contents of the image.

11. The system of claim 9, wherein applying the version-specific encryption to the generated firmware update package further comprises:

receiving a trigger for the OTA firmware update, wherein receiving the trigger for the OTA firmware update comprises receiving an indication of a period update check for one or more target vehicles, receiving a request to push updates to the one or more target vehicles, or receiving a request from each of the one or more target vehicles to pull updates for the corresponding vehicle;

identifying each vehicle of the plurality of vehicles based on the received trigger; and encrypting the version key using the private key maintained by the one or more servers for each identified vehicle of the plurality of vehicles.

12. The system of claim 9, wherein the instructions further cause the one or more servers to sign the generated firmware update package with a certificate authenticating a source of the generated firmware update package and, upon expiration of the generated firmware update package, add the certificate used to sign the generated firmware update package to a Certificate Revocation List (CRL).

13. The system of claim 9, wherein distributing the encrypted generated firmware update package and the encrypted version keys to the plurality of vehicles comprises sending the encrypted generated firmware update package and the encrypted version keys to the plurality of vehicles over the one or more communications networks.

14. A non-transitory computer-readable medium comprising a set of instructions stored therein which, when executed by a processor, causes the processor to provide a secure Over-The-Air (OTA) firmware update to one or more vehicles of a plurality of vehicles by:

generating a firmware update package for the plurality of vehicles;

applying a version-specific encryption to the generated firmware update package using a version key, the version key comprising a key specific to a version for the firmware update;

applying a vehicle-specific encryption to the version key using a plurality of vehicle keys, each vehicle key comprising a private key maintained by one or more servers and specific to each of the plurality of vehicles, wherein applying the vehicle-specific encryption to the version key using the plurality of vehicle keys generates a plurality of encrypted version keys; and distributing the encrypted generated firmware update package and the plurality of encrypted version keys to the plurality of vehicles over one or more communications networks, wherein distributing the encrypted generated firmware update package and the plurality of encrypted version keys to the plurality of vehicles comprises sending the encrypted generated firmware update package and the plurality of encrypted version keys over the one or more communication networks to a service tool and transferring the encrypted generated firmware update package and one of the plurality of encrypted version keys from the service tool to each of the plurality of vehicles for installation through an On-Board Diagnostics (OBD) port of each of the plurality of vehicles, wherein the one of the plurality of encrypted version keys transferred to each of the plurality of vehicles is selected by the service tool based on a vehicle identification of the corresponding vehicle, and wherein each vehicle decrypts the one of the plurality of encrypted version keys transferred from the service tool using a private key maintained by the corresponding vehicle, decrypts the encrypted generated firmware update package using the decrypted one of the plurality of encrypted version keys, and applies the decrypted generated firmware update package.

15. The non-transitory computer-readable medium of claim 14, wherein the generated firmware update package comprises an image for firmware to update in the plurality of vehicles and a manifest for the image, wherein the image for the firmware to update in the generated firmware update package comprises an image of all firmware for each of the plurality of vehicles, and wherein the manifest for the image identifies contents of the image and defines dependencies for modules within the identified contents of the image.

16. The non-transitory computer-readable medium of claim 14, wherein applying the vehicle-specific encryption to the key specific to the version for the firmware update and used to encrypt the generated firmware update package further comprises:
   receiving a trigger for the OTA firmware update, wherein receiving the trigger for the OTA firmware update comprises receiving an indication of a period update check for one or more target vehicles, receiving a request to push updates to the one or more target vehicles, or receiving a request from each of the one or more target vehicles to pull updates for the corresponding vehicle;
   identifying each vehicle of the plurality of vehicles based on the received trigger; and
   encrypting the version key using the private key maintained by the one or more servers for each identified vehicle of the plurality of vehicles.

17. The non-transitory computer-readable medium of claim 14, wherein the instructions further cause the one or more servers to sign the generated firmware update package with a certificate authenticating a source of the generated firmware update package and, upon expiration of the generated firmware update package, add the certificate used to sign the generated firmware update package to a Certificate Revocation List (CRL).

* * * * *